(12) United States Patent  (10) Patent No.: US 8,400,990 B1
Volpano  (45) Date of Patent: Mar. 19, 2013

(54) GLOBAL SERVICE SET IDENTIFIERS

(76) Inventor: Dennis Volpano, Salinas, CA (US)

( * ) Notice: Subject to any disclaimer, the term of this patent is extended or adjusted under 35 U.S.C. 154(b) by 470 days.

(21) Appl. No.: 12/424,155

(22) Filed: Apr. 15, 2009

Related U.S. Application Data

(60) Provisional application No. 61/048,528, filed on Apr. 28, 2008.

(51) Int. Cl.
  *H04W 4/00* (2009.01)
  *H04B 7/00* (2006.01)
(52) U.S. Cl. .................................. 370/338; 370/310.2
(58) Field of Classification Search .................... 370/338
  See application file for complete search history.

(56) References Cited

U.S. PATENT DOCUMENTS

| | | | |
|---|---|---|---|
| 7,292,592 B2 | 11/2007 | Rune | |
| 2003/0002456 A1* | 1/2003 | Soomro et al. | 370/328 |
| 2004/0068668 A1* | 4/2004 | Lor et al. | 713/201 |
| 2004/0156399 A1* | 8/2004 | Eran | 370/913 |
| 2004/0187030 A1* | 9/2004 | Edney et al. | 713/201 |
| 2005/0223111 A1* | 10/2005 | Bhandaru et al. | 709/236 |
| 2007/0266134 A1* | 11/2007 | Shyy et al. | 709/223 |
| 2007/0268859 A1* | 11/2007 | Yao et al. | 370/328 |
| 2008/0072047 A1* | 3/2008 | Sarikaya et al. | 713/171 |
| 2009/0129386 A1* | 5/2009 | Rune | 370/392 |

OTHER PUBLICATIONS

RFC2396 (Uniform Resource Identifiers (URI): generic Syntax; http://www.ietf.org/rfc/rfc2396.txt).*

* cited by examiner

*Primary Examiner* — Derrick Ferris
*Assistant Examiner* — Kodzovi Acolatse
(74) *Attorney, Agent, or Firm* — Fountainhead Law Group P.C.

(57) ABSTRACT

Specifying the hosting WLAN switch controller for a WiFi VPN connection from a public hotspot should not require managing separate name spaces for switch controllers and SSIDs. Instead, identification of the controller should be done within the standard 802.11 protocol using SSIDs that resolve to IP addresses. Users therefore need only manage a single SSID name space for both WiFi VPN connections and local wireless connections.

5 Claims, 11 Drawing Sheets

Multiple Remote BSS Access via GSSID-enabled AP

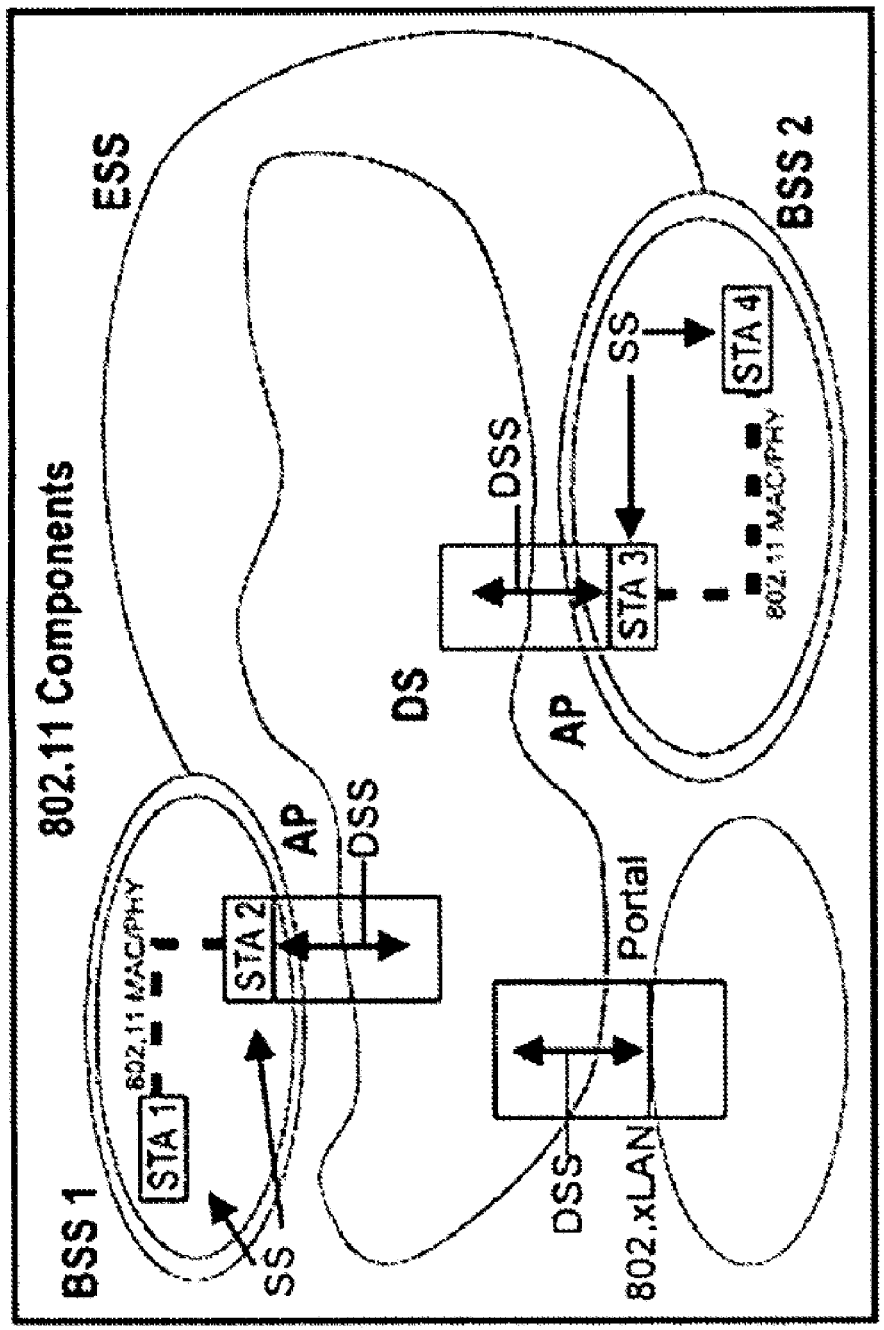
Fig. 1 Complete 802.11 Architecture
(prior art)

| Order | Information | Notes |
|---|---|---|
| 1 | Timestamp | |
| 2 | Beacon Interval | |
| 3 | Capability information | |
| 4 | SSID | |
| 5 | Supported Rates | |
| 6 | FH Parameter Set | The FH Parameter Set information element is present within Beacon frames generated by STAs using frequency-hopping PHYs. |
| 7 | DS Parameter Set | The DS Parameter Set information element is present within Beacon frames generated by STAs using direct sequence PHYs. |
| 8 | CF Parameter Set | The CF Parameter Set information element is only present within Beacon frames generated by APs supporting a PCF. |
| 9 | IBSS Parameter Set | The IBSS Parameter Set information element is only present within Beacon frames generated by STAs in an IBSS. |
| 10 | TIM | The TIM information element is only present within Beacon frames generated by APs. |

102

FIG. 2 Beacon frame body
(prior art)

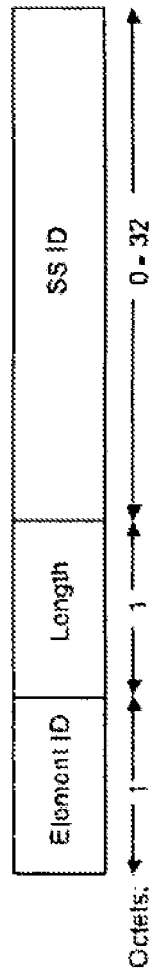
Fig. 3 Probe request frame body
(prior art)
Fig. 5 802.11 SSID information element
(prior art)

103

| Order | Information | Notes |
|---|---|---|
| 1 | Timestamp | |
| 2 | Beacon Interval | |
| 3 | Capability information | |
| 4 | SSID | |
| 5 | Supported Rates | |
| 6 | FH Parameter Set | The FH Parameter Set information element is present within Probe Response frames generated by STAs using frequency-hopping PHYs. |
| 7 | DS Parameter Set | The DS Parameter Set information element is present within Probe Response frames generated by STAs using direct sequence PHYs. |
| 8 | CF Parameter Set | The CF Parameter Set information element is only present within Probe Response frames generated by APs supporting a PCF. |
| 9 | IBSS Parameter Set | The IBSS Parameter Set information element is only present within Probe Response frames generated by STAs in an IBSS. |

Fig. 4  Probe response frame body
(prior art)

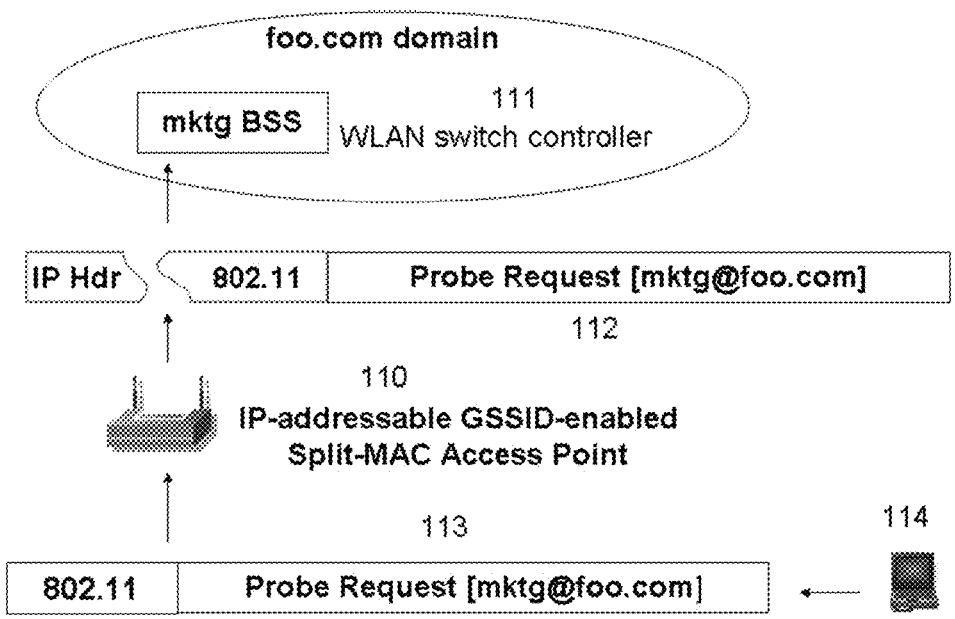
Fig. 6  Routed 802.11 Probe Request
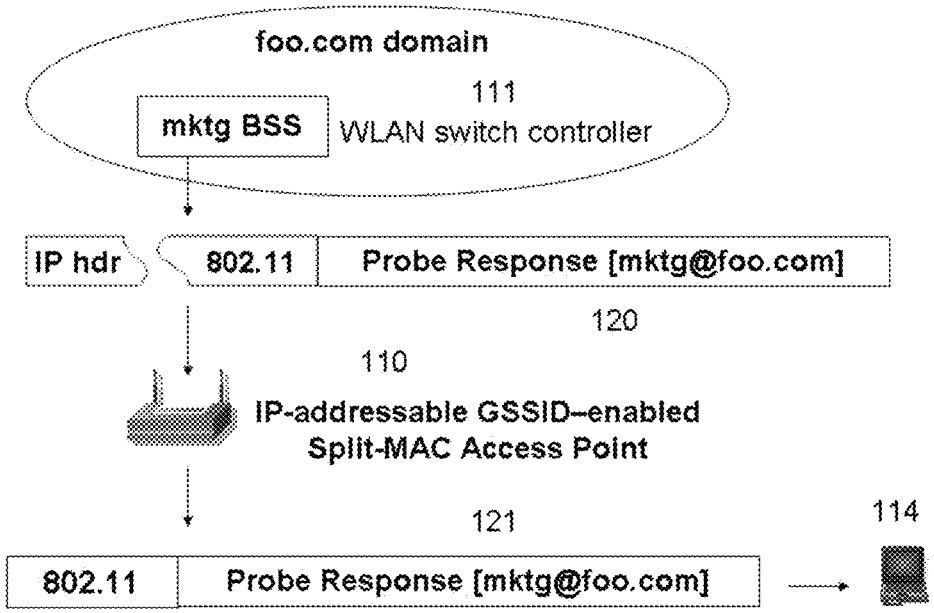
Fig. 7  Routed 802.11 Probe Response

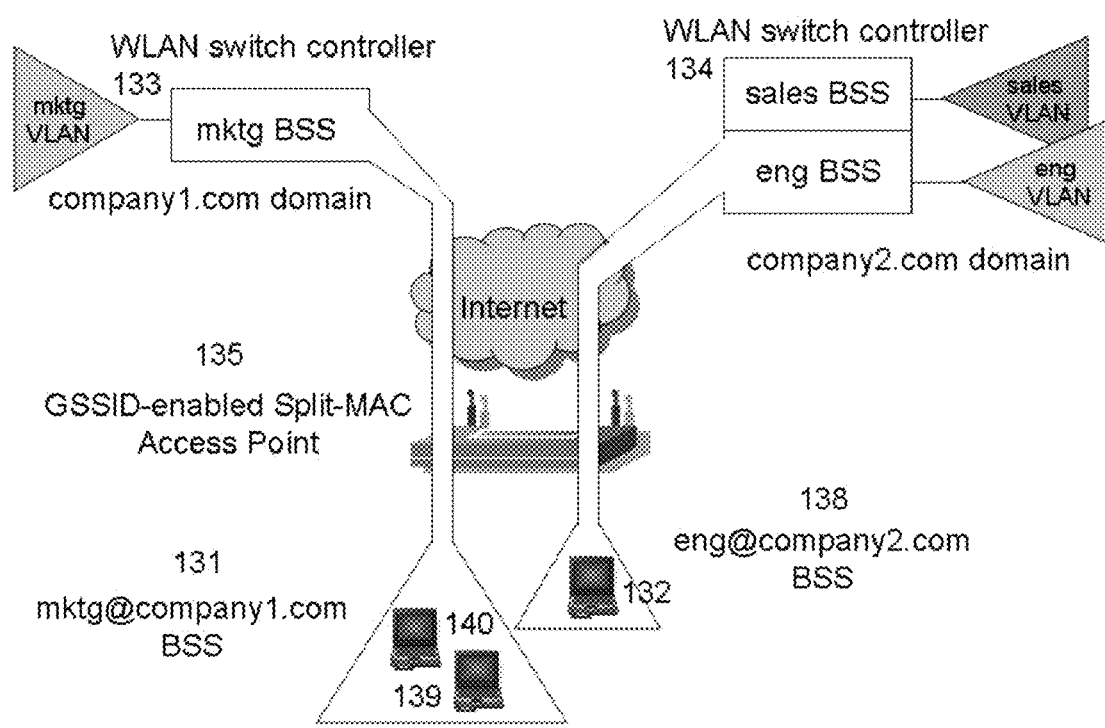
Fig. 8 Multiple Remote BSS Access via GSSID-enabled AP

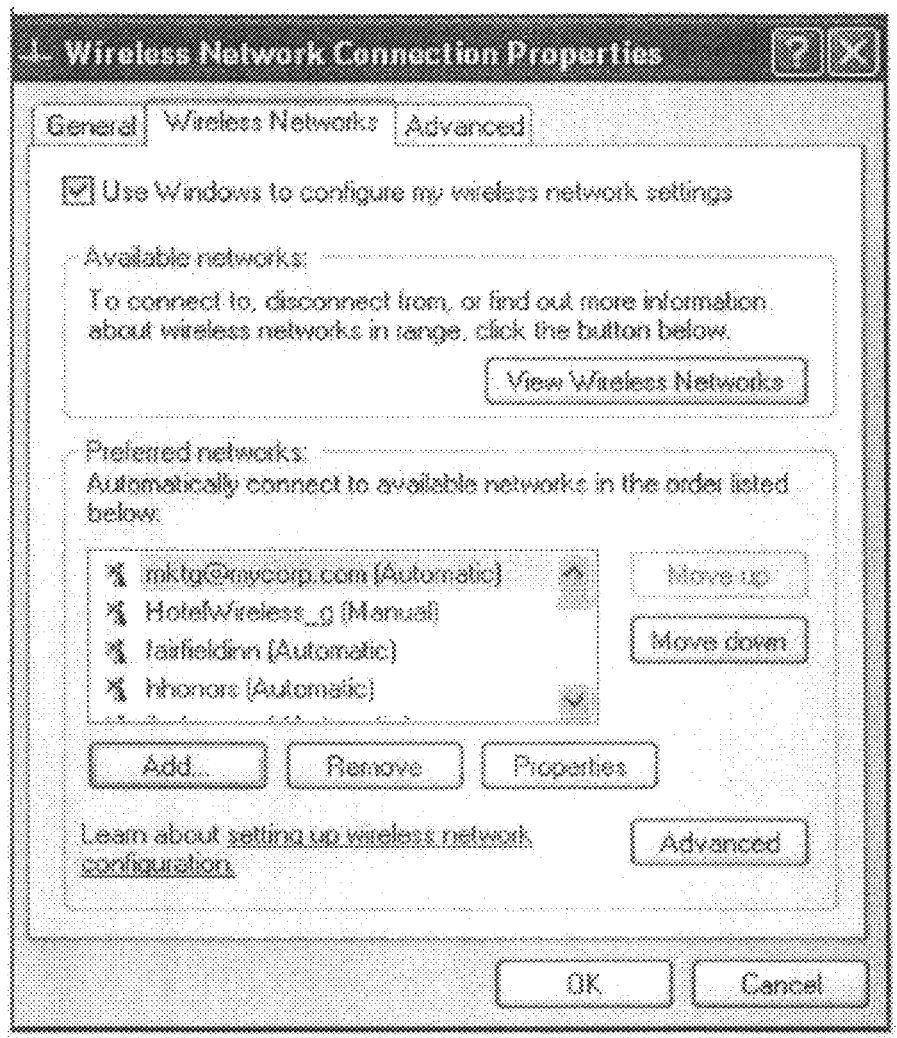
Fig. 9 Laptop Computer Wireless Connection Manager
Showing Global Service Set ID mktg@mycorp.com

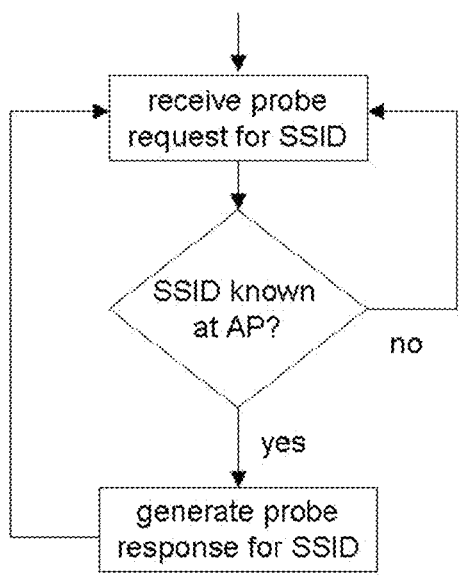
Fig. 10 Standard Probe Request Processing at an AP
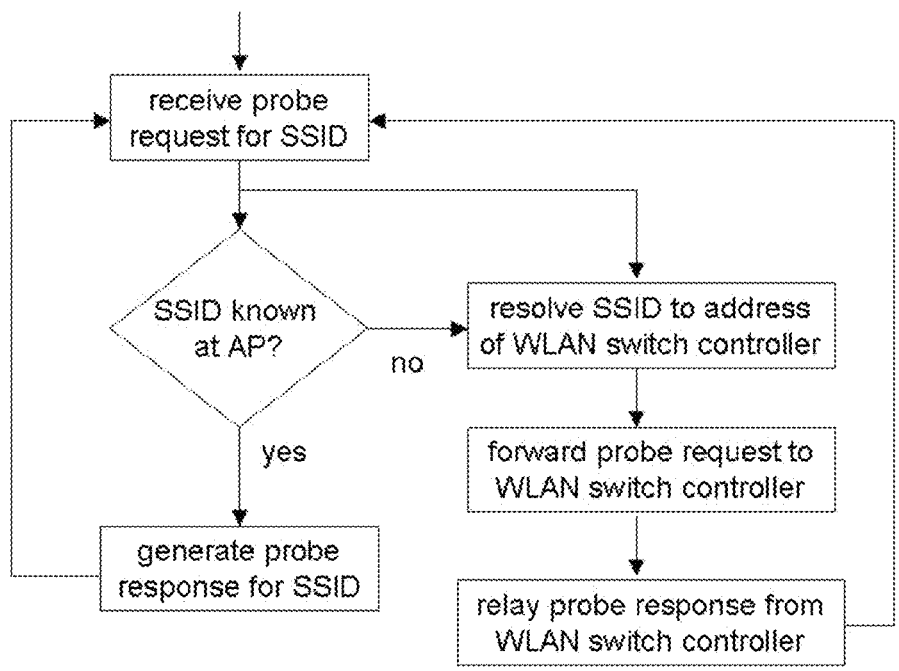
Fig. 11 Probe Request Processing at GSSID-enabled AP

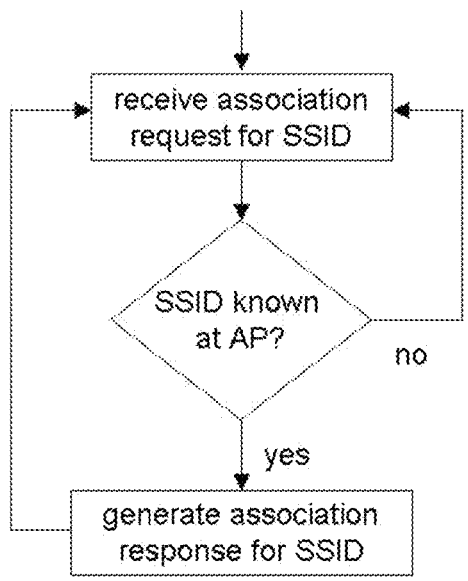
Fig. 12  Standard Association Request Processing at an AP
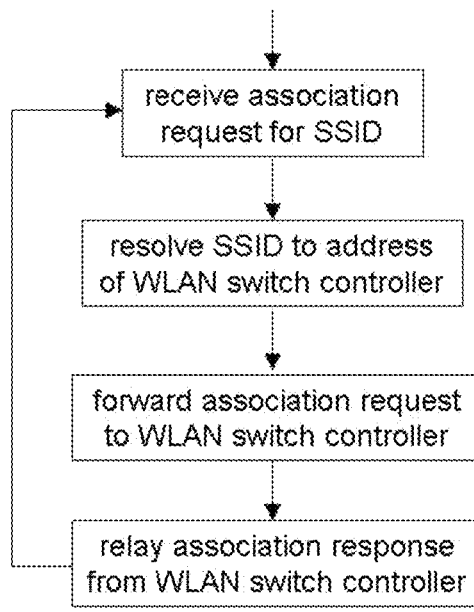
Fig. 13  Association Request Processing at GSSID-enabled AP

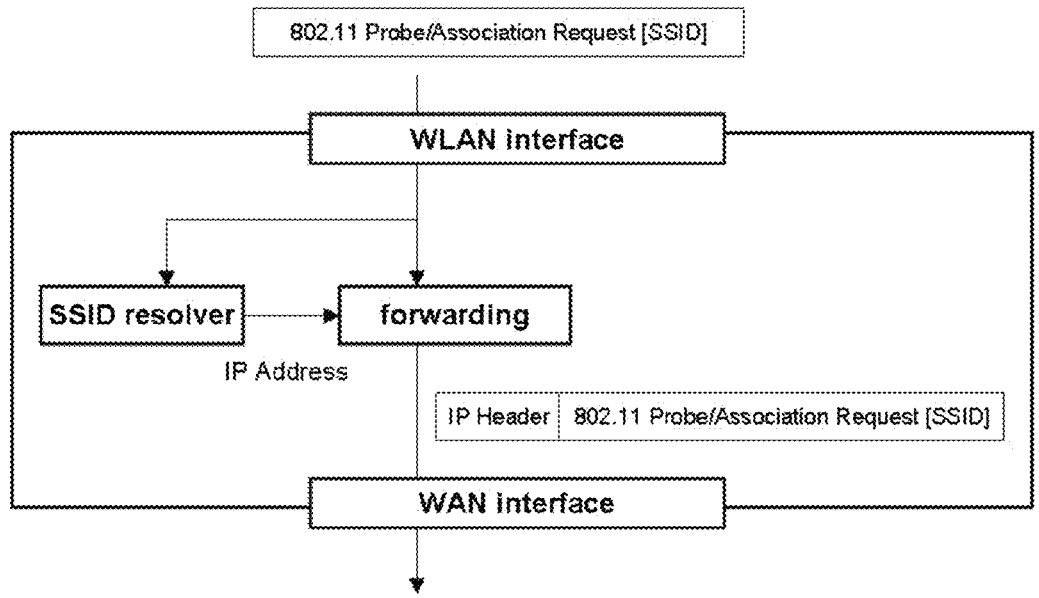
Fig. 14 GSSID-enabled AP Forwarding Process
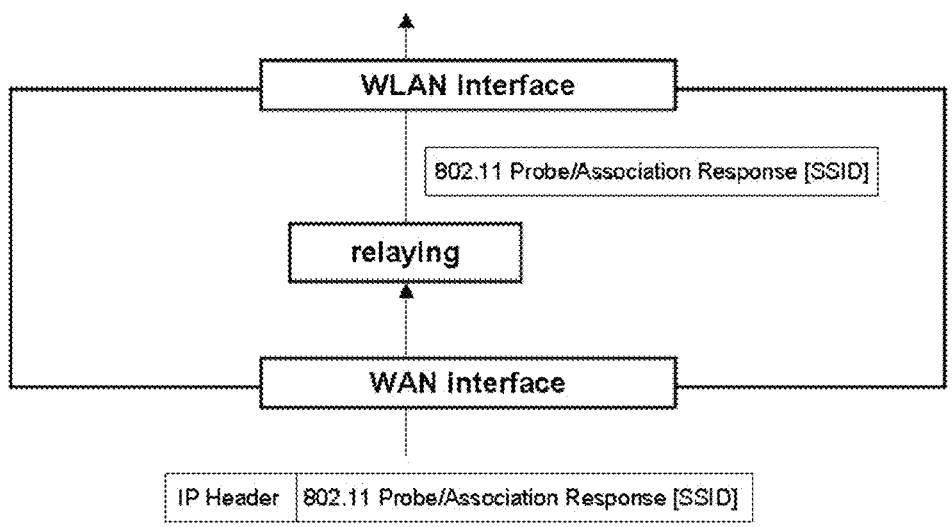
Fig. 15 GSSID-enabled AP Relaying Process

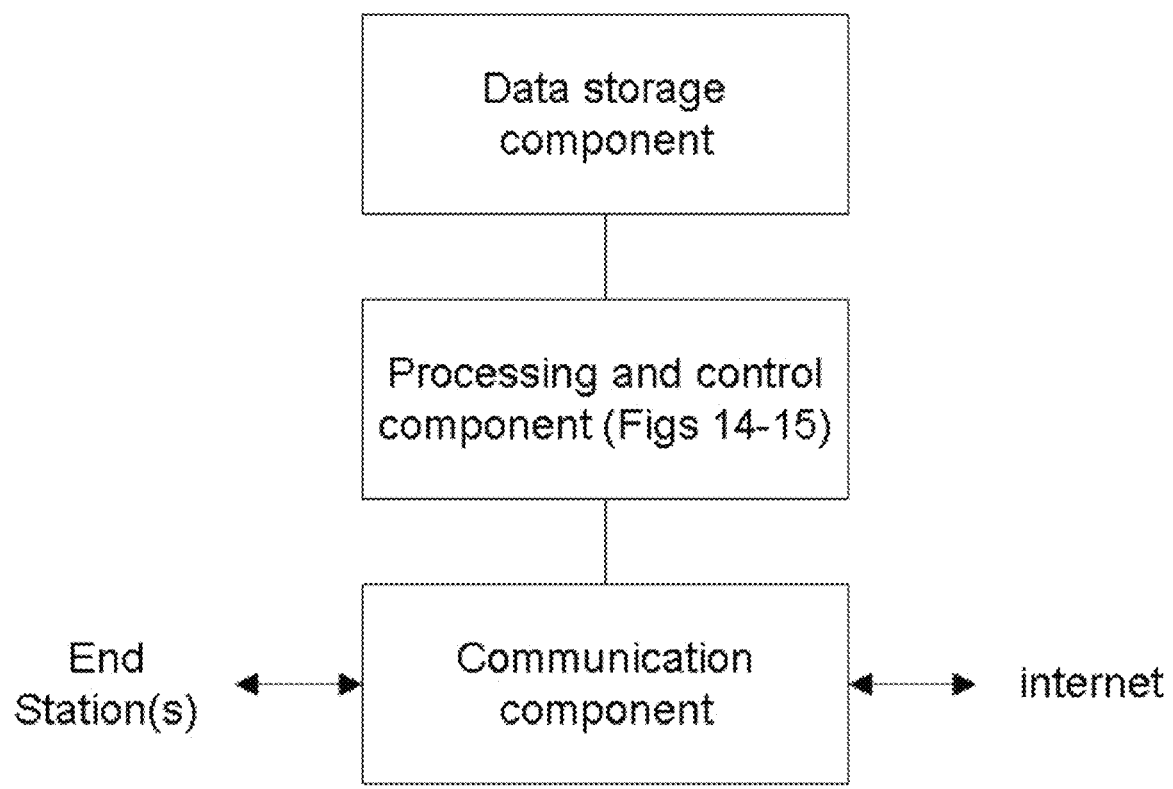
Fig. 16 Components of GSSID-enabled AP

GLOBAL SERVICE SET IDENTIFIERS

CROSS-REFERENCES TO RELATED APPLICATIONS

This application claims priority from commonly owned U.S. Provisional Application No. 61/048,528, filed Apr. 28, 2008 which is incorporated herein in its entirety for all purposes.

BACKGROUND OF THE INVENTION

A wireless local area network (WLAN) comprises a Basic Service Set (BSS) in the IEEE 802.11 standard (hereinafter "802.11"). A BSS is a broadcast domain and may be connected to another BSS via a Distribution System (DS) forming an Extended Service Set (ESS) (FIG. 1). A BSS is identified by a hardware address (the BSSID) and a Service Set Identifier (the SSID). The SSID is a 32-octet string that is referenced by users of devices who wish to join the BSS.

There are two common approaches to implementing a standard 802.11 BSS. The first implements the entire 802.11 MAC-PHY protocol on a single device. This is called a local Media Access Control (MAC) and the device is called a thick Access Point (AP). The second implements the PHY layer and perhaps a portion of the MAC layer on one device, called a thin or lightweight AP, and the rest of the MAC layer on a remote device typically called a WLAN switch controller that can be reached over a routed network. This latter approach is called a split MAC. With either a local or split MAC, a wireless device issues an 802.11 Association Request containing an SSID information element (FIG. 5) field to associate with the BSS denoted by the SSID supplied in that field. An SSID may be learned through 802.11 beacons (FIG. 2 shows the data comprising a beacon frame 104 as defined under the 802.11 standard) or through a response (FIG. 4 shows the data comprising a probe response frame 103 as defined under the 802.11 standard) to an 802.11 probe request 102 (FIG. 3) initiated by a device. Whether the MAC is split or local is transparent to the device. It associates with the BSS in the same way whether or not the MAC is split.

With the split-MAC approach, the WLAN switch controller can be located anywhere on the Internet. A wireless device can establish a secure tunnel between itself and the WLAN switch using the standard 802.11 wireless security encapsulation. Such a tunnel makes a conventional VPN client unnecessary on the device. The WLAN switch controller replaces the VPN concentrator. As long as a wireless device can communicate with a split-MAC AP, it can form a secure tunnel to the controller using standard 802.11 security. This type of tunnel has been termed a "WiFi VPN" (see Patent Pub No. US2005/0223111). For example, FIG. 8 shows wireless devices 139 and 140 connected remotely, via a split-MAC AP 135, to the marketing BSS in the domain called COMPANY1.COM, and device 132 connected remotely through the same AP to an engineering BSS in the COMPANY2.COM domain.

If a split-MAC AP is installed in a public hotspot to allow connections to remote WLAN switch controllers then there must be a protocol for allowing a wireless device to specify the switch controller hosting the remote BSS it wishes to join. The split-MAC AP may need to route part of the 802.11 MAC protocol to a WLAN switch for one wireless device and to another switch for another device. How does the split-MAC AP know to which switch it should route the 802.11 MAC protocol for a given wireless device?

One approach is for the AP to send a wireless device an EAPOL (Extensible Authentication Protocol over LANs) request identity message to which the device responds with a cleartext field giving the name of a switch controller or a server that can identify it (e.g., see ¶ [0226] of Patent Pub No. US2005/0223111 incorporated herein by reference for all purposes). The switch-controller name has no relationship to the SSIDs that a user of a wireless device sees displayed in an 802.11 wireless connection manager. A device with only standard 802.11 EAP (Extensible Authentication Protocol) processing does not supply the cleartext field. A modification is needed to standard 802.11 processing to convey the controller name and a device must now manage a switch-controller name space in addition to its existing SSID name space.

BRIEF SUMMARY OF THE INVENTION

The invention provides a network access device referred to herein as a GSSID-enabled Access Point (AP). The invention allows a wireless device (e.g. a laptop computer) to convey, within the standard IEEE 802.11 protocol, the SSID of a BSS or WLAN whose hosting switch controller is located on an internet. The SSID field of the 802.11 SSID information element (FIG. 5 (101)) is used to supply an SSID that can be resolved to the IP address of a WLAN switch controller. This information element appears, for instance, in Beacon (FIG. 2 (104)), Probe Request (FIG. 3 (102)) and Probe Response (FIG. 4 (103)) frame bodies. Such an SSID can resolve in accordance with the present invention to an IP address using universal standards such as FQDN (Fully-qualified Domain Name), NAI (Network Access Identifier) and URI (Uniform Resource Identifier). The SSID then has "global" meaning and is therefore called a Global Service Set Identifier (GSSID) for the purposes of the following discussions of the present invention.

A schematic diagram of a GSSID-enabled AP is shown in FIG. 16. It comprises WLAN and WAN interfaces with forwarding and relaying components. The forwarding component shown in FIG. 14 attaches a routable address via an IP header to the Probe/Association Request, and then sends the Request, with the routable address attached, to an ingress router connected to the WAN interface. The relaying component shown in FIG. 15 removes the routable address attached via an IP header to a Probe/Association Response received from an egress router connected to the WAN interface, and then sends the Response with no routable address attached to the WLAN interface. IP Probe and Association request handling at a GSSID-enabled AP is shown in FIGS. 11 and 13. A GSSID-enabled AP can support access to a local BSS, access to a remote BSS hosted on a WLAN switch controller, and split access to a local and remote BSS simultaneously.

A local BSS provides a conventional local MAC per the 802.11 standard. This allows access directly to the subnet to which the AP is connected. Traffic on this subnet might be routed to the Internet, for instance. For a remote BSS, a GSSID-enabled AP implements the 802.11 MAC protocol as a split MAC where a portion of the MAC protocol is tunneled to a WLAN switch controller hosting the BSS. In this case, all traffic from a wireless device traverses the WLAN switch controller. If that traffic is destined for the Internet then it traverses the switch controller before reaching its final destination. Split access allows a device to be simultaneously associated with a local and remote BSS. With split access, a device can access resources like print servers on the local BSS while accessing servers on the remote BSS. It also affords direct access to the Internet via the local BSS. Like a network switch, the device can determine to which BSS an egress frame should be sent based on a destination hardware address. Based upon the BSSID or inner source and destination address of a received frame, a GSSID-enabled AP can determine whether the frame should be bridged to a local BSS or tunneled to a remote BSS.

The invention permits a device to manage a single SSID name space for both remote and local WLAN connections. For example, FIG. 9 shows the GUI on a laptop computer for WLAN profile management under Windows Zero Config (WZC), a Microsoft wireless connection manager. The first SSID listed, "mktg@mycorp.com", is a GSSID and is defined in accordance with the present invention. It comprises a domain name "mycorp.com" which can be resolved via a Domain Name Service (DNS) to a routable address such as the Internet Protocol (IP) address of a wireless LAN switch controller hosting WLAN "mktg" somewhere on the Internet. A routable address is a logical address in a hierarchical addressing scheme used by Layer 3 (Network Layer) of the Open Systems Interconnection (OSI) Reference Model to send data one hop at a time, from end system to ingress router, router to router, and from egress router to destination end system. The GSSID is treated on the laptop device like any other SSID and is listed there for management purposes and establishing network connections. However, unlike a conventional SSID, a GSSID is not coupled to an access point. The laptop does not have to be in the vicinity of the WLAN identified by "mktg@mycorp.com" in order to connect to it. Other wireless networks listed by WZC are conventional SSIDs that are coupled to access points. These are the networks that the laptop can connect to only if it's within proximity of these access points. For example, "fairfieldinn" and "hhonors" are conventional SSIDs coupled to access points provided by the Fairfield Inn and Hilton hotels to create wireless hotspot networks for their customers. The "hotspot" is a term which has gained popular use in recent years and refers to the AP provided by a business such as a hotel, coffee house, and the like.

Suppose a user is located at a FairField Inn hotspot that has a GSSID-enabled AP. Then choosing "mktg@mycorp.com" from the list in FIG. 9 connects their device to BSS "mktg" at mycorp.com whereas selecting "fairfieldinn" connects the device to the local hotspot BSS at the FairField Inn. One way to convey split access between both might be to first associate with "fairfieldinn" then with "mktg@mycorp.com". This is only an example of how to convey split access and the invention is not limited to this way.

One embodiment of the invention uses an SSID of the form ssid@FQDN where "ssid" is a standard 802.11 SSID and FQDN is a fully-qualified domain name. A fully-qualified domain name, sometimes referred to as an absolute domain name, is a domain name that specifies its exact location in the tree hierarchy of the Domain Name System (DNS). It specifies all domain levels, including the top-level domain and the root domain. A fully qualified domain name is distinguished by its unambiguity; it can only be interpreted one way. The "ssid" part may be used to reference the BSS when a device is local to the BSS. The full name may be used to reference it from anywhere on an internet. In this case, FQDN may resolve to the IP address of WLAN switch controller. An 802.11 Association with a BSS may then occur directly between a device and the switch controller. An entire EAP protocol, including the 802.11i 4-way handshake, can occur between the device and switch controller via a GSSID-enabled access point. A GSSID-enabled access point merely provides a communication channel between them and does not have to be a party to any crypto key-exchange protocol used by the device and controller to secure the connection between them.

Another embodiment of the present invention uses an SSID of the form home-realm!ssid@intermediate-realm. This form resembles the Network Access Identifier (NAI). Where the NAI is intended to identify a user, here it is an SSID indirectly denoting a BSS. The SSID first identifies a selected intermediate provider network called "intermediate-realm". The intermediate network provider may be selected based upon a roaming agreement the provider has with home-realm [see Arkko et al, Network Discovery and Selection Problem]. The provider then converts the SSID to ssid@home-realm where home-realm may be a domain name that resolves to an IP address of a network device that enables remote access to the BSS. Association with a BSS may then occur directly between a device and the BSS via the network device and the intermediate provider network.

Another embodiment uses an SSID of the form ssid@home-realm:port;parameters. This form resembles a SIP URI [RFC 2396] where home-realm may be a fully-qualified domain name, port is a network port number, and parameters provide information to the home-realm.

In another embodiment, an SSID is formed by encrypting all or some part of a cleartext SSID.

BRIEF DESCRIPTION OF THE DRAWINGS

FIG. 1 shows an 802.11 Extended Service Set (ESS) comprising two Basic Service Sets connected by a Distribution System (DS).

FIG. 2 shows a conventional 802.11 Beacon frame body.

FIG. 3 shows a conventional 802.11 Probe Request frame body.

FIG. 4 shows a conventional 802.11 Probe Response frame body.

FIG. 5 defines a conventional 802.11 SSID information element.

FIG. 6 shows use of SSID mktg@foo.com in an 802.11 Probe Request frame in accordance with the present invention.

FIG. 7 shows an IP packet containing a Probe Response frame in accordance with the present invention.

FIG. 8 shows a Global Service Set ID (GSSID)-enabled Split-MAC access point in accordance with the present invention.

FIG. 9 shows a wireless connection manager GUI as it would appear on a wireless device that uses the present invention.

FIG. 10 shows a conventional 802.11 Probe Request processing sequence.

FIG. 11 shows an 802.11 Probe Request processing at a GSSID-enabled AP in accordance with the present invention.

FIG. 12 shows an 802.11 Association Request processing at a standard access point.

FIG. 13 shows an 802.11 Association Request processing at a GSSID-enabled AP in accordance with the present invention.

FIG. 14 shows a forwarding path through a GSSID-enabled AP in accordance with the present invention.

FIG. 15 shows a relay path through a GSSID-enabled AP in accordance with the present invention.

FIG. 16 shows a schematic diagram of a GSSID-enabled AP in accordance with the present invention.

DETAILED DESCRIPTION OF THE INVENTION

FIG. 6 shows use of SSID mktg@foo.com in an 802.11 Probe Request frame (113) sent by device (114) to a Global Service Set ID (GSSID)-enabled Split-MAC access point (110). Access point (110) resolves the domain name foo.com to a routable IP address which becomes the destination IP address of an IP packet (112) containing 802.11 Probe Request frame (113). The IP packet is then routed through an internet to reach a destination WLAN switch controller (111) which is a member of domain foo.com.

FIG. 7 shows an IP packet (120) containing a Probe Response sent from WLAN switch controller (111) in domain foo.com to a Global Service Set ID (GSSID)-enabled Split-MAC access point (110) in response to receiving IP packet (112) of FIG. 6. Access point (110) extracts the 802.11 Probe Response from the packet and sends it to device (114). Access point (110) may choose to subsequently beacon SSID mktg@foo.com and/or respond to a subsequent Probe Request for it without routing the request to switch controller (111).

FIG. 8 shows a Global Service Set ID (GSSID)-enabled Split-MAC access point (135) servicing connections to two remote Basic Service Sets in different domains simultaneously. Device (132) sends a Probe Request containing SSID eng@company2.com to access point (135). After receiving a Probe Response from WLAN switch controller (134), access point (135) creates 802.11 BSS (138) having SSID eng@company2.com at access point (135) which may periodically send an 802.11 Beacon for BSS (138) containing SSID eng@company2.com to allow other devices to discover it. Device (132) completes an 802.11 association with BSS eng on (134) in the company2.com domain without necessarily first associating with access point (135). FIG. 8 also shows devices (139) and (140) as members of another 802.11 BSS (131), having SSID mktg@company1.com, resulting from each device completing an 802.11 association with BSS "mktg" on WLAN switch controller (133) in the company1.com domain. Devices (139) and (140) belong to a common broadcast domain and share an encryption key for group traffic, while station (132) belongs to a separate broadcast domain and has a different encryption key for group traffic.

FIG. 9 shows a wireless connection manager GUI as it would appear on a wireless device that uses the invention. Standard wireless profiles Hotel Wireless_g, fairfieldinn and hhonors are shown. Their scope is a wireless hotspot, unlike SSID "mktg@mycorp.com" whose scope is universal by virtue of using a globally-unique domain name mycorp.com.

FIG. 10 shows 802.11 Probe Request processing at a standard access point.

FIG. 11 shows 802.11 Probe Request processing at a GSSID-enabled AP. The AP may choose to respond to a Probe Request for an SSID directly, if it has seen a request for that SSID before, or resolve the SSID to an address of a WLAN switch controller.

FIG. 12 shows 802.11 Association Request processing at a standard access point.

FIG. 13 shows 802.11 Association Request processing at a GSSID-enabled AP.

FIG. 14 shows the forwarding path through a GSSID-enabled AP.

FIG. 15 shows the relay path through a GSSID-enabled AP.

FIG. 16 shows a schematic diagram of a GSSID-enabled AP. FIG. 16 is a generalized block diagram of a GSSID-enabled AP. Typically, an AP is a computer-based device. The computer portion comprises a memory component and a process and control component. The memory component represents any of a number of conventionally known data storage devices (disk drive, flash memory, DRAM, EEPROM, etc.). In accordance with the present invention, the memory component stores suitable computer executable program code to perform the steps outlined in FIGS. 11 and 13. It is understood of course that additional program code is stored in the memory component to perform conventional tasks, such as would be provided by an operating system, and to implement conventional communication protocols as shown by example in FIGS. 10 and 12.

The processor and control component controls the communication component in accordance with the program code to communicate with one or more end stations (e.g., laptop computers and other computer-based devices to access the internet) and to provide data transmission over the Internet. The communication component typically includes conventionally known circuits for wired communication (e.g., Ethernet) and for wireless communication (e.g., IEEE 802.11 compliant and other wireless communications).

What is claimed is:

1. A network access point that allows a device to associate with a BSS hosted by a WLAN switch controller situated on an internet, comprising:
    a network interface for receiving an 802.11 probe request for said BSS from said device, said 802.11 probe request including a Service Set Identifier that identifies said BSS; and
    an 802.11 probe request processing component responsive to said 802.11 probe request to produce an 802.11 probe response, and comprising:
        an SSID resolver component responding to said Service Set Identifier in said 802.11 probe request including resolving said Service Set Identifier to produce a routable IP address of said WLAN switch controller, wherein said Service Set Identifier has the form identifier@fully-qualified-domain-name, where "identifier" is an identifier and "fully-qualified-domain-name" is a fully qualified domain name;
        a forwarding component responding to said 802.11 probe request and configured to include forwarding said 802.11 probe request to said WLAN switch controller using said routable IP address; and
        a responding component that receives a response from said WLAN switch controller and generates and sends said 802.11 probe response, said 802.11 probe response including information in said response from said WLAN switch controller.

2. The access point of claim 1 wherein said response from said WLAN switch controller is an 802.11 probe response.

3. A method in a network access point comprising the network access point configured to perform steps comprising:
    receiving from a device an 802.11 probe request to discover an 802.11 Basic Service Set (BSS) hosted by a WLAN device situated on an internet, said 802.11 probe request including a Service Set Identifier (SSID) that identifies said BSS, wherein said Service Set Identifier has the form <identifier@fully-qualified-domain-name>, wherein "identifier" is an identifier and "fully-qualified-domain-name" is a fully qualified domain name;
    responding to the 802.11 probe request comprising:
        generating from said SSID an IP address of said WLAN device;
        forwarding said 802.11 probe request to said WLAN device;
        receiving from said WLAN device a response to said 802.11 probe request; and
        forwarding to said device an 802.11 probe response that includes said response from said WLAN device.

4. The method of claim 3 wherein said response from said from said WLAN device is an 802.11 probe response.

5. A network access point comprising:

an interface for receiving from a sending device an 802.11 probe request including a Service Set Identifier (SSID) that identifies a Basic Service Set (BSS), wherein said SSID has the form <identifier@fully-qualified-domain-name>, wherein "identifier" is an identifier and "fully-qualified-domain-name" is a fully qualified domain name;

a processor configured to respond to said 802.11 probe request including performing steps of:

generating from said SSID an IP address of a network device;

forwarding said 802.11 probe request to said network device using said IP address;

receiving from said network device a response to said 802.11 probe request; and forwarding to said sending device an 802.11 probe response that includes said response from said network device.

* * * * *